United States Patent
Kosaka et al.

(10) Patent No.: US 8,935,050 B2
(45) Date of Patent: Jan. 13, 2015

(54) MOVING BODY CONTROL SYSTEM, MOVING BODY CONTROL METHOD, AND NON-TRANSITORY COMPUTER READABLE MEDIUM STORING CONTROL PROGRAM

(71) Applicants: Yusuke Kosaka, Chofu (JP); Susumu Oikawa, Yokohama (JP)

(72) Inventors: Yusuke Kosaka, Chofu (JP); Susumu Oikawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/167,225

(22) Filed: Jan. 29, 2014

(65) Prior Publication Data
US 2014/0236426 A1 Aug. 21, 2014

(30) Foreign Application Priority Data
Feb. 15, 2013 (JP) ................... 2013-027828

(51) Int. Cl.
*A01B 69/00* (2006.01)
*B62D 37/00* (2006.01)

(52) U.S. Cl.
CPC ...................... *B62D 37/00* (2013.01)
USPC ........................................ 701/41

(58) Field of Classification Search
None
See application file for complete search history.

(56) References Cited

U.S. PATENT DOCUMENTS

| | | | |
|---|---|---|---|
| 2006/0260857 A1 | 11/2006 | Kakinuma et al. | |
| 2008/0164832 A1* | 7/2008 | Kawaguchi et al. | 318/456 |
| 2010/0030440 A1 | 2/2010 | Kosaka | |
| 2010/0030441 A1 | 2/2010 | Kosaka | |
| 2010/0030442 A1 | 2/2010 | Kosaka | |
| 2011/0060513 A1 | 3/2011 | Oikawa et al. | |
| 2011/0169441 A1* | 7/2011 | Yoshiura et al. | 318/625 |
| 2013/0038265 A1* | 2/2013 | Igarashi et al. | 318/469 |

FOREIGN PATENT DOCUMENTS

| | | |
|---|---|---|
| JP | 2006-315666 A | 11/2006 |
| JP | 2010-030436 A | 2/2010 |
| JP | 2010-030438 A | 2/2010 |
| JP | 2010-035330 A | 2/2010 |
| JP | 2011-051557 A | 3/2011 |
| WO | 9623478 A1 | 8/1996 |

* cited by examiner

*Primary Examiner* — Thomas Tarcza
*Assistant Examiner* — Adam Alharbi
(74) *Attorney, Agent, or Firm* — Gifford, Krass, Sprinkle, Anderson & Citkowski, P.C.

(57) ABSTRACT

A moving body control system includes a driving velocity detector that detects a driving velocity of a driving device that drives a moving body, a posture state detecting device that detects posture information of the moving body, a posture controller that produces a first driving velocity command for the driving device, based on the posture information and an entered posture information command, a velocity command producer that produces a second driving velocity command for the driving device, by adding the first driving velocity command and the driving velocity, and a velocity controller that controls the driving device, by producing a torque command for the driving device, based on the second driving velocity command and the driving velocity. The velocity controller performs velocity control so that the driving velocity follows the second driving velocity command. The posture controller performs posture control so that the posture information follows the posture information command.

5 Claims, 10 Drawing Sheets

FIG. 8

MOVING BODY CONTROL SYSTEM, MOVING BODY CONTROL METHOD, AND NON-TRANSITORY COMPUTER READABLE MEDIUM STORING CONTROL PROGRAM

INCORPORATION BY REFERENCE

The disclosure of Japanese Patent Application No. 2013-027828 filed on Feb. 15, 2013 including the specification, drawings and abstract is incorporated herein by reference in its entirety.

BACKGROUND OF THE INVENTION

1. Field of the Invention

The invention relates to a moving body control system that performs drive control based on self-posture information, a moving body control method, and a non-transitory computer readable medium in which a control program is stored.

2. Description of Related Art

In recent years, technologies for controlling travel motion and posture of a coaxial two-wheel vehicle by detecting self-posture information, using a gyro sensor, an acceleration sensor, etc., and controlling a drive motor or motors provided in the coaxial two-wheel vehicle, based on the detected posture information, have been developed. In this type of coaxial two-wheel vehicle, the self-posture information is detected based on signals from the gyro sensor and acceleration sensor, and a rotation command to the motor(s) is computed so that the vehicle can maintain its own posture, according to the principle of posture control using an inverted pendulum, or the principle of ZMP (zero moment point) control for two-legged robots. Then, rotation command data thus obtained is transmitted to a motor control device. Thus, the two-wheel vehicle is able to travel due to changes in the center of gravity or posture of a vehicle rider, while maintaining its own posture through the above feedback control.

The above-described coaxial two-wheel vehicle is unstable in its front-back direction because of its structure, and the posture is stabilized by performing drive control on the wheels based on feedback from a posture sensor. Also, vehicle operations, such as forward and backward travelling, and right and left turns, are performed according to a command provided by shift of the center of gravity of the rider, a command provided by inclination of a step or steps, a command from a control bar, or the like. In other cases, the coaxial two-wheel vehicle may be remotely operated according to a command entered from the outside, or may make autonomous movements based on its own trajectory planning.

However, in a known control system of the coaxial two-wheel vehicle, it requires substantial time to perform arithmetic processing for detection of the posture. Therefore, a quick-response posture sensor and a controller (CPU (Central Processing Unit)) having high computing power are needed, so as to achieve a fast control cycle while keeping sufficient control performance. Namely, an expensive system (including CPU and posture sensor) is supposed to be used, resulting in an increased cost. If, on the other hand, an inexpensive system is employed, the control cycle slows, and a control gain(s) cannot be increased, resulting in deterioration of the performance. Therefore, a method that enables an inexpensive system to achieve a fast control cycle while keeping sufficient control performance is strongly desired.

In the meantime, an inverted two-wheel vehicle is known (see, for example, Japanese Patent Application Publication No. 2010-030436 (JP 2010-030436 A)) in which a torque command for motors is produced based on a driving velocity command based on posture information and detected driving velocities of the wheels to drive the motors.

When the inverted two-wheel vehicle travels based on a constant velocity command while being inclined by a certain angle in the travelling direction, for example, the inverted two-wheel vehicle makes uniform or constant-velocity motion, and cannot provide the inertial force that corrects the inclination of the inverted two-wheel vehicle; therefore, the vehicle rider has to perform a cumbersome operation or movement to raise the posture up.

SUMMARY OF THE INVENTION

The invention provides a moving body control system in which an acceleration component is added to a posture velocity command, so that the vehicle rider need not perform an operation or make a movement for the purpose of correcting inclination of the vehicle. The invention also provides a moving body control method, and a non-transitory computer readable medium storing a control program.

A first aspect of the invention is concerned with a moving body control system including a driving device configured to drive a-moving body, a driving velocity detector configured to detect a driving velocity of the driving device, a posture state detecting device configured to detect posture information of the moving body, a posture controller configured to produce a first driving velocity command for the driving device, based on the detected posture information, and an entered posture information command, a velocity command producer configured to produce a second driving velocity command for the driving device, by adding the first driving velocity command produced by the posture controller, and the detected driving velocity, and a velocity controller configured to control the driving device, by producing a torque command for the driving device, based on the produced second driving velocity command, and the driving velocity detected by the driving velocity detector. The velocity controller performs velocity control so that the driving velocity detected by the driving velocity detector follows the second driving velocity command produced by the velocity command producer. The posture controller is configured to perform posture control so that the posture information detected by the posture state detecting device follows the entered posture information command.

The posture controller may be configured to produce a posture velocity command for the driving device, based on the detected posture information and the entered posture information command, and the moving body control system may further include a turning control device configured to produce a turning velocity command for the moving body based on an entered turning information command, and an adding/subtracting device configured to produce a first wheel angular velocity command for the moving body, by adding the posture velocity command produced by the posture controller, and the turning velocity command produced by the turning control device, or subtracting the turning velocity command from the posture velocity command. The velocity command producer may be configured to produce a second wheel angular velocity command, by adding the calculated first wheel angular velocity command, and a wheel angular velocity detected by the driving velocity detector, and the velocity controller may perform velocity control so that the wheel angular velocity detected by the driving velocity detector follows the produced second wheel angular velocity command.

The moving body control system may further include an average velocity calculating device configured to calculate an average wheel angular velocity as an average value of the detected wheel angular velocities of the right and left wheels, and the velocity command producer may be configured to produce the second wheel angular velocity command, by adding the first wheel angular velocity command calculated for each of the right and left wheels, and the calculated average wheel angular velocity.

A second aspect of the invention is concerned with a moving body control method including the steps of: detecting a driving velocity of a driving device that drives a moving body, detecting posture information of the moving body, producing a first driving velocity command for the driving device, based on the detected posture information, and an entered posture information command, producing a second driving velocity command for the driving device, by adding the produced first driving velocity command, and the detected driving velocity, controlling the driving device, by producing a torque command for the driving device, based on the produced second driving velocity command, and the detected driving velocity, performing velocity control so that the detected driving velocity follows the produced second driving velocity command, and performing posture control so that the detected posture information follows the entered posture information command.

A third aspect of the invention is concerned with a non-transitory computer readable medium storing therein a control program that causes a computer to perform the steps of producing a first driving velocity command for a driving device that drives a moving body, based on detected posture information of the moving body, and an entered posture information command, producing a second driving velocity command for the driving device, by adding the produced first driving velocity command, and a detected driving velocity of the driving device that drives the moving body, controlling the driving device, by producing a torque command for the driving device, based on the produced second driving velocity command, and the detected driving velocity, performing velocity control so that the detected driving velocity follows the produced second driving velocity command, and performing posture control so that the detected posture information follows the entered posture information command.

According to the invention, the moving body control system, moving body control method, and control program are provided with which the vehicle rider need not perform an operation or make a movement for the purpose of correcting inclination of the vehicle since an acceleration component is added to the posture velocity command.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a control block diagram showing the system configuration of a moving body control system according to a second embodiment of the invention.

DETAILED DESCRIPTION OF EMBODIMENTS

Figure 1:
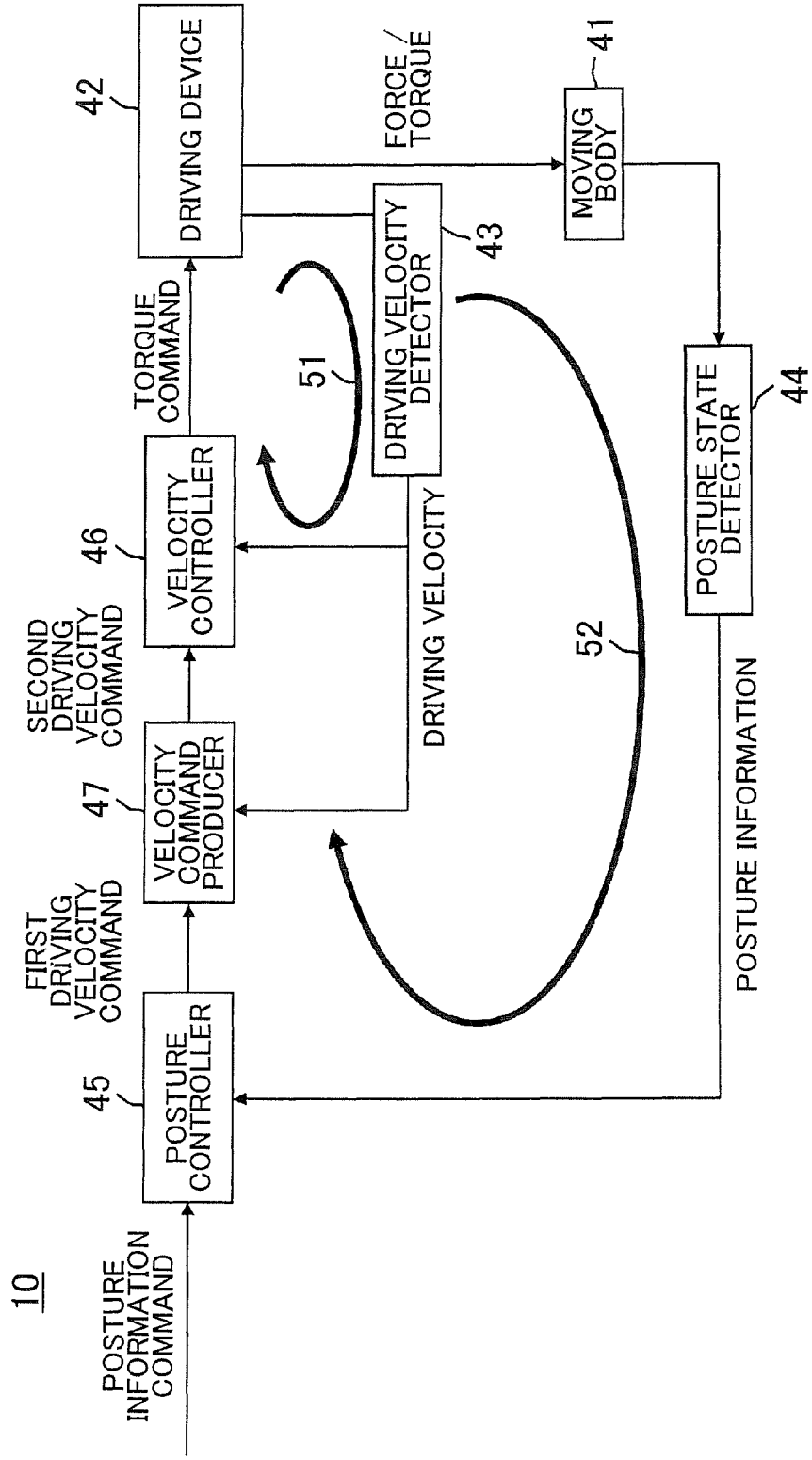
FIG. 1 is a control block diagram schematically showing a control system of a moving body control system according to the invention.

Initially, a first embodiment of the invention will be briefly described. FIG. 1 is a control block diagram schematically showing a control system of a moving body control system according to the invention. The moving body control system 10 of the invention includes a driving device 42 that drives a moving body 41, a driving velocity detector 43 that detects the driving velocity of the driving device 42, a posture state detecting device 44 that detects posture information of the moving body 41, a posture controller 45 that produces a first driving velocity command for the driving device 42, based on the detected posture information and a posture information command entered into the posture controller 45, a velocity command producer 47 that produces a second driving velocity command for the driving device 42, by adding the produced first driving velocity command, and the driving velocity detected by the driving velocity detector 43, and a velocity controller 46 that controls the driving device 42 by producing a torque command to be generated to the driving device 42, based on the produced second driving velocity command and the driving velocity detected by the driving velocity detector 43.

Further, the posture controller 45 performs posture control so that the posture information detected by the posture state detecting device 44 follows the entered posture information command, and the velocity controller 46 performs velocity control so that the driving velocity detected by the driving velocity detector 43 follows the second driving velocity command produced by the velocity command producer 47.

The moving body control system 10 configured as described above has a control loop 51 including the velocity controller 46 capable of high-speed control at a low cost, and a control loop 52 including the posture controller 45, such that the control loop 51 is provided inside the control loop 52. This arrangement makes it possible to implement higher-performance control, while reducing the cost of the system as a whole. Furthermore, the detected driving velocity is added to the produced first driving velocity command, so that the driving velocity command has an implication of an acceleration command. In this manner, the inertial force that raises the moving body 41 up in a pitching direction can be naturally produced, whereby the moving body 41 can be better stabilized.

Furthermore, the velocity control is performed by the velocity controller 46 that is a faster, lower-level controller than the posture controller 45 that performs posture control, thus assuring high robustness against load variations (e.g., load variations due to disturbance from a road surface on which the moving body (e.g., a vehicle) is running, or floating of a wheel). Accordingly, the stability of the moving body in the travelling direction is improved, and the moving body can be stabilized even if one of its two wheels floats.

Figure 2A:
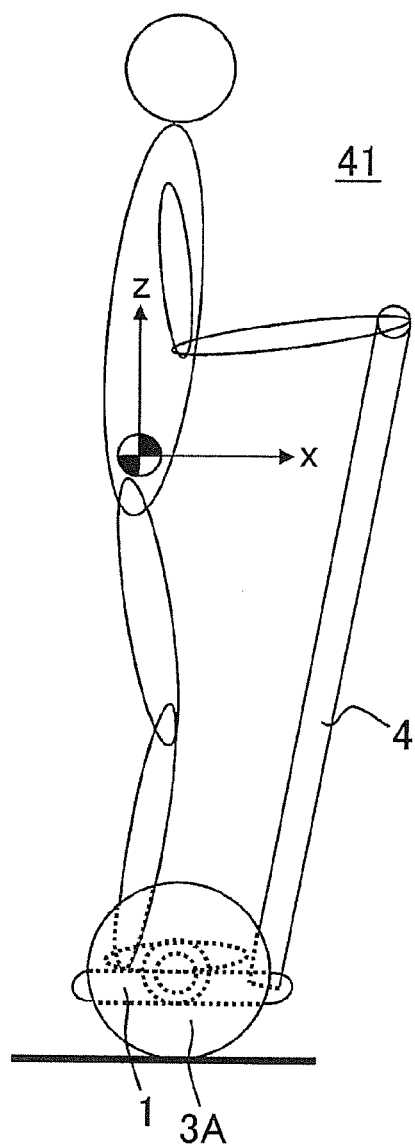
FIG. 2A is a side view showing the construction of a moving body according to a first embodiment of the invention.
Figure 2B:
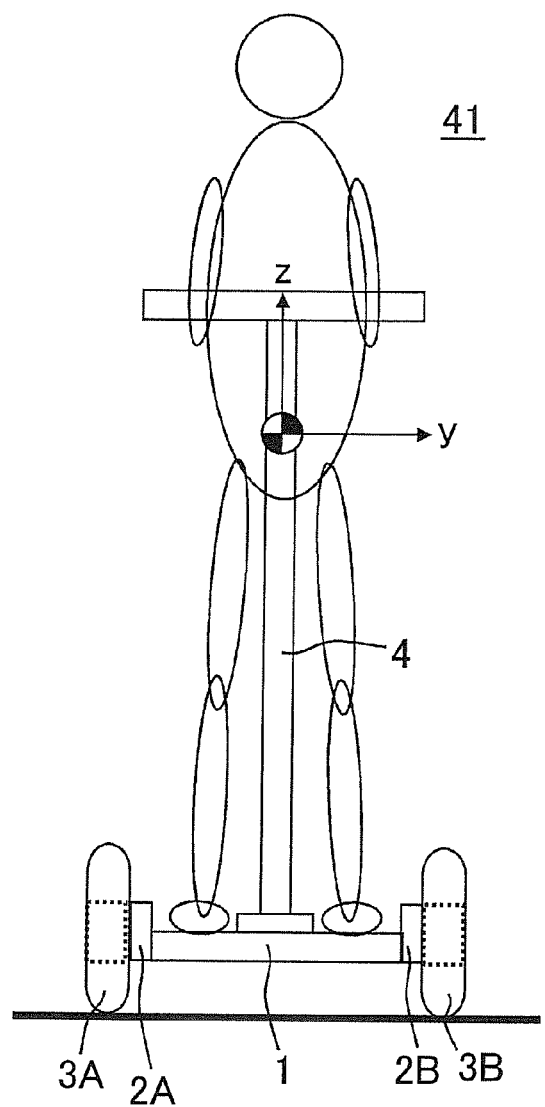
FIG. 2B is a front view showing the construction of the moving body according to the first embodiment of the invention.

FIG. 2A and FIG. 2B illustrate a moving body according to the first embodiment of the invention. FIG. 2A is a side view of the moving body, and FIG. 2B is a front view thereof. In FIG. 2A and FIG. 2B, the moving body 41 of the first embodiment is constructed as a coaxial two-wheel vehicle having a vehicle main body 1 on which a vehicle rider stands, and two wheels 3A, 3B disposed in parallel with each other on the same axis and mounted to the vehicle main body 1. The invention is not limitedly applied to this type of vehicle, but may also be applied to any inverted moving body.

In the following description, the moving body 41 will be referred to as the coaxial two-wheel vehicle 41. A coordinate system for the vehicle as a whole has the X-axis that extends in a direction perpendicular to the axle, Y-axis that extends in the direction of the axle, and the Z-axis that extends in the vertical direction, as indicated in FIG. 2A and FIG. 2B. In the coordinate system, a direction around the axle (about the Y axis) is referred to as a pitching direction, and a rotational direction on the X-Y plane as viewed from above the vehicle is referred to as a yawing direction.

As shown in FIG. 2A and FIG. 2B, the coaxial two-wheel vehicle 41 according to the first embodiment includes the vehicle main body 1, a pair of right and left wheels 3A and 3B rotatably mounted on the vehicle main body 1, a T-shaped handle 4 provided on the vehicle main body 1 and adapted to be gripped by the rider, and the moving body control system 10 installed on the vehicle main body 1 for control of the coaxial two-wheel vehicle 41.

Figure 3:
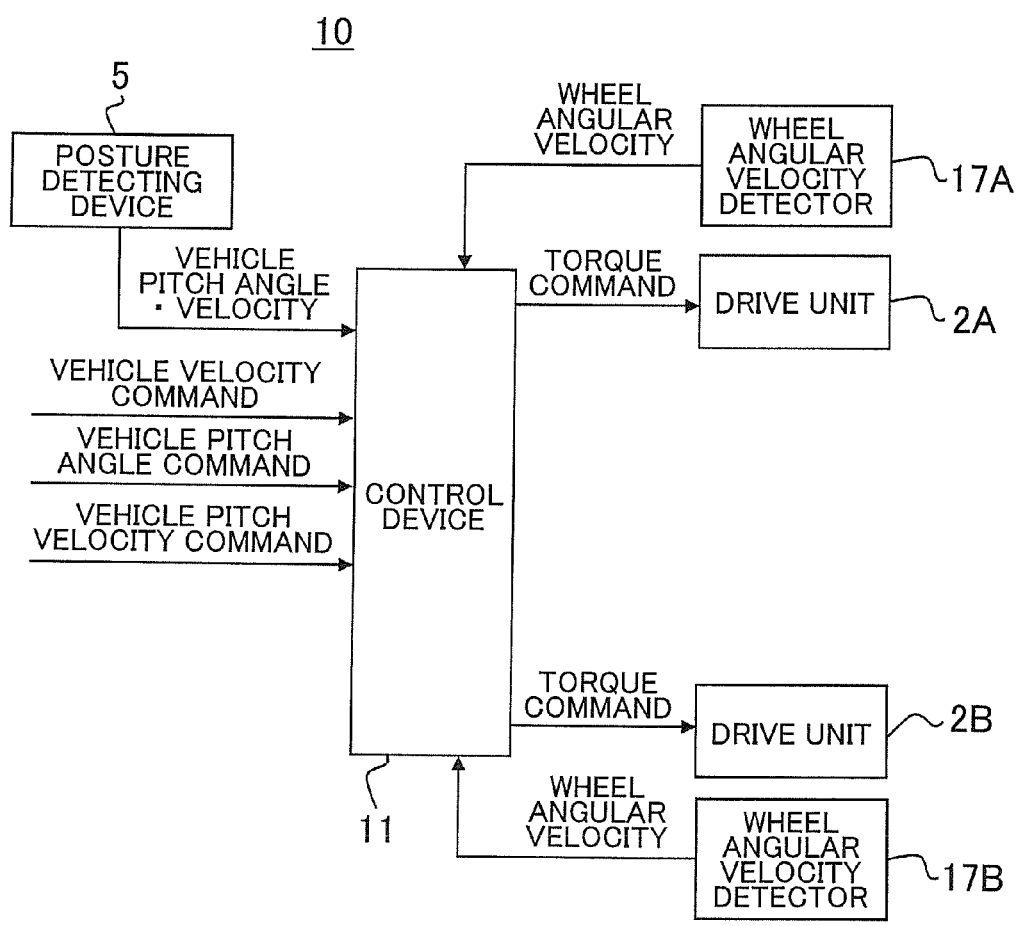
FIG. 3 is a block diagram showing the system configuration of a moving body control system according to the first embodiment of the invention.

FIG. 3 is a block diagram showing the system configuration of the moving body control system 10 according to the first embodiment. The moving body control system 10 according to the first embodiment includes a posture detecting device 5 that detects posture information of the vehicle main body 1, a pair of drive units 2A, 2B that drive the respective wheels 3A, 3B, a control device 11 that controls the drive units 2A, 2B, and a pair of wheel angular velocity detectors 17A, 17B that detect the wheel angular velocities of the respective wheels 3A, 3B.

The posture detecting device 5, which is one specific example of the posture state detecting device 44, is provided on the vehicle main body 1, and detects posture information of the vehicle main body 1, including tilt or inclination of the vehicle main body 1 in the front-back direction (about the Y axis). The posture detecting device 5 detects, for example, the vehicle pitch angle (posture angle) and vehicle pitch velocity (posture angular velocity) of the vehicle main body 1. The posture detecting device 5 detects the vehicle pitch angle and vehicle pitch velocity, using a gyro sensor and an acceleration sensor, for example. The posture detecting device 5 outputs the detected posture information to the control device 11.

The drive units 2A, 2B as one specific example of the driving device 42 are operable to drive the two respective wheels 3A, 3B disposed on the same axis, independently of each other. Each of the drive units 2A, 2B includes a motor, an amplifier, etc., for driving a corresponding one of the wheels 3A, 3B. Each of the drive units 2A, 2B performs torque control on the corresponding drive unit 2A, 2B, based on a torque command generated from the control device 11. As the motor of each of the drive units 2A, 2B rotates, torque is applied to the corresponding wheel 3A, 3B. Also, reaction force of the torque is applied to the vehicle main body 1 as each of the motors rotates, and force as reaction force from the ground is applied to the vehicle main body 1 as the wheels 3A, 3B rotate.

The control device 11, which is installed on the vehicle main body 1, produces torque commands, based on the vehicle pitch angle and pitch velocity received from the posture detecting device 5, vehicle velocity command entered, vehicle pitch angle command (=0), and a vehicle pitch velocity command (=0), and the wheel angular velocities received from the respective wheel angular velocity detectors 17A, 17B. Then, the control device 11 outputs the torque commands to the respective drive units 2A, 2B, thereby to control the drive units 2A, 2B.

The control device 11 performs control so that the actual vehicle pitch angle and vehicle pitch velocity stably follow the vehicle pitch angle command and vehicle pitch velocity command as target values in the pitching direction of the vehicle, for example. Namely, the control device 11 calculates drive torque required to stabilize the whole system so as to prevent it from falling down, based on the target values and information received from the posture detecting device 5, and drives the motors of the respective drive units 2A, 2B. On the other hand, the respective wheel angular velocity detectors 17A, 17B detect the wheel angular velocities of the corresponding wheels 3A, 3B as the motors of the corresponding drive units 2A, 2B rotate, and feed the detected velocities back to the control device 11. With the vehicle control thus configured, the coaxial two-wheel vehicle 41 travels forward and backward when the rider shifts his/her weight (or the center of gravity) back and forth, and turns left or right when the rider operates a turning device, or the like.

Each of the wheel angular velocity detectors 17A, 17B, which is one specific example of the driving velocity detector 43, detects a relative angular velocity between the vehicle main body 1 and each of the wheels 3A, 3B as the wheel angular velocity. Each of the wheel angular velocity detectors 17A, 17B detects the wheel angular velocity, based on information from an encoder provided on a rotary shaft of the motor of the corresponding drive unit 2A, 2B, and outputs the detected angular velocity to the control device 11. Each of the wheel angular velocity detectors 17A, 17B may detect a wheel angle, i.e., a relative angle between the vehicle main body 1 and the corresponding wheel 3A, 3B, and output the detected wheel angle to the control device 11.

Figure 4:
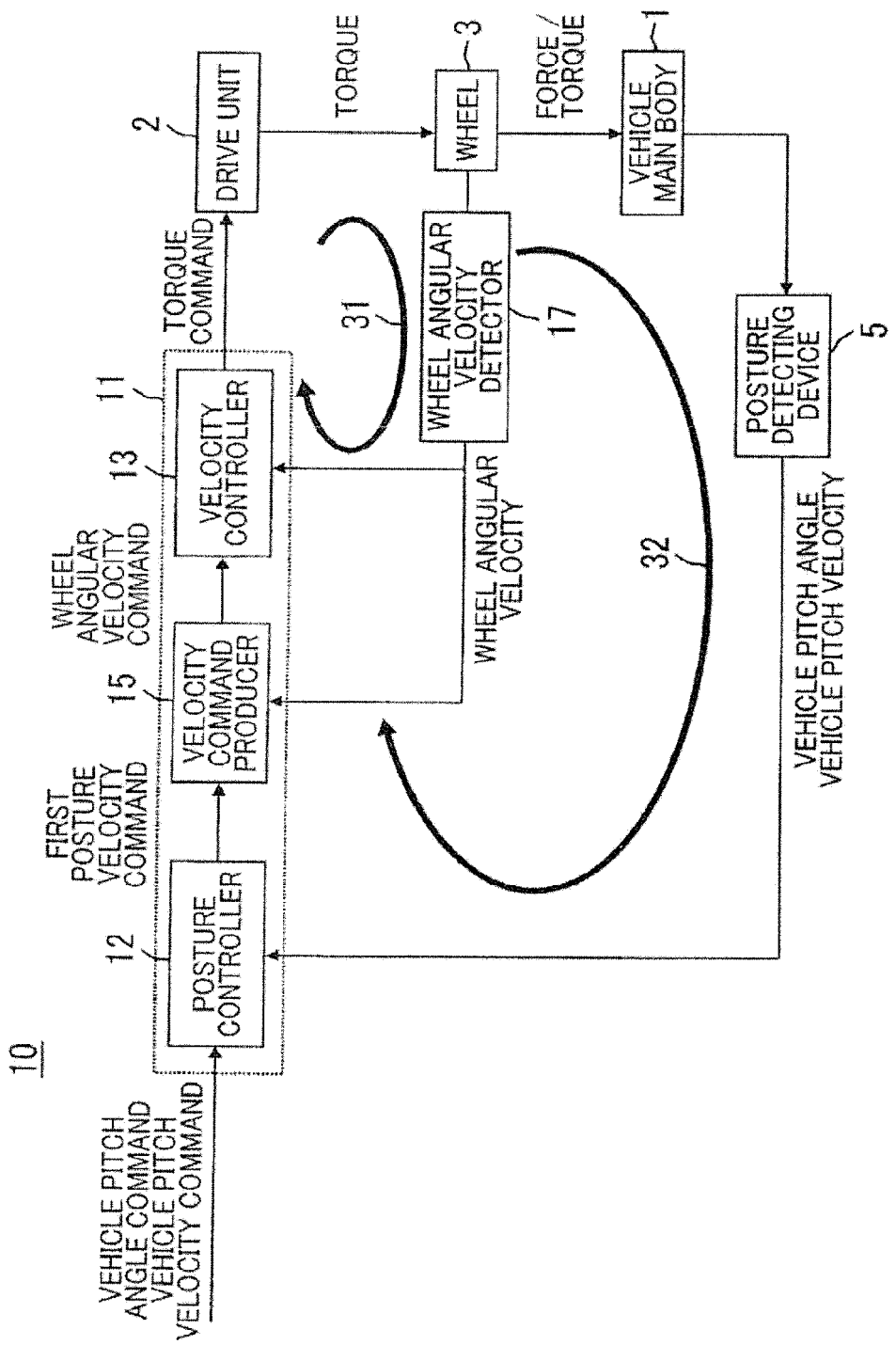
FIG. 4 is a control block diagram showing the system configuration of the moving body control system according to the first embodiment of the invention.
Figure 5:
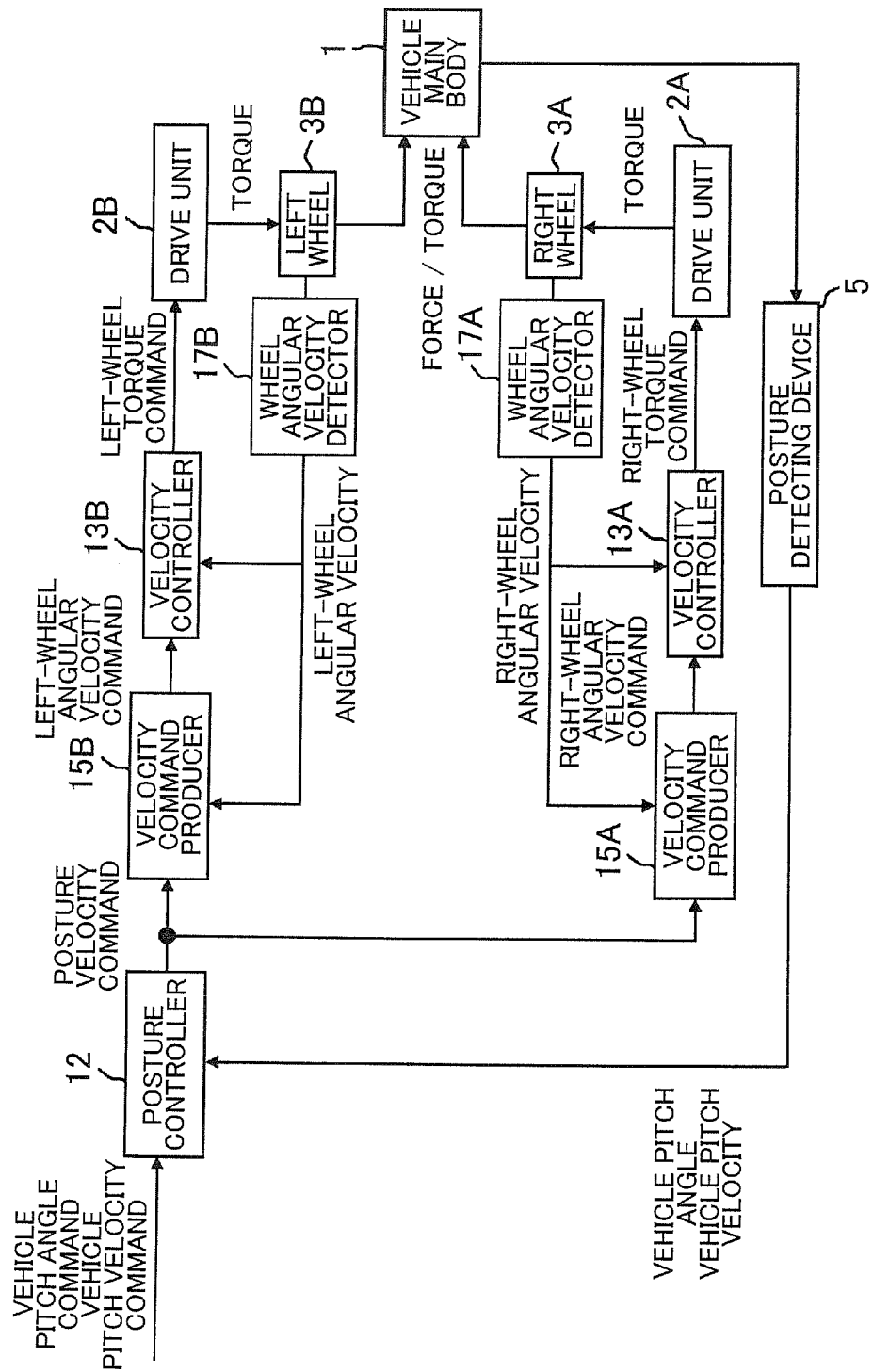
FIG. 5 is a view useful for explaining a motion control system shown in FIG. 4 in greater detail with respect to respective drive units and wheels.

Referring next to FIG. 4 and FIG. 5, vehicle motion control will be described in detail. FIG. 4 is a control block diagram showing the system configuration of the moving body control system according to the first embodiment. FIG. 5 is a view useful for explaining the motion control system shown in FIG. 4 in greater detail with respect to the drive units 2A, 2B, and the wheels 3A, 3B.

Initially, variables used in the following description will be described. $\beta$ denotes a vehicle pitch angle, and $\beta'$ denotes a vehicle pitch velocity. x denotes a vehicle position, and x' denotes a vehicle velocity. The vehicle pitch angle $\beta$, vehicle pitch velocity $\beta'$, vehicle position x, and the vehicle velocity x' are detected values. $\beta_r$ denotes a vehicle pitch angle command, and $\beta'_r$ denotes a vehicle pitch velocity command. $x_r$ denotes a vehicle position command, and $x'_r$ denotes a vehicle velocity command. $\gamma'_r$ denotes a yaw velocity command of the vehicle. The vehicle pitch angle command $\beta_r$, vehicle pitch velocity command $\beta'_r$, vehicle position command $x_r$, vehicle velocity command $x'_r$, and the yaw velocity command $\gamma'_r$ are command values as target values. Namely, variables with subscript "r" denote command values, and variables without subscript "r" denote detected values. Also, 2L denotes the tread width, and $R_w$ denotes the wheel radius. In the first embodiment, the vehicle motion control as illustrated in FIG. 4 is motion control to be performed during normal running of the vehicle, and at least the vehicle pitch angle command and the vehicle pitch velocity command are entered into a posture controller 12 (which will be described).

As shown in FIG. 4, the control device 11 according to the first embodiment has the posture controller 12 that produces a posture velocity command, a velocity command producer 15 that produces a wheel angular velocity command, and a velocity controller 13 that produces a torque command.

The posture controller 12, which is one specific example of the posture controller 45, performs posture control so that the vehicle pitch angle and vehicle pitch velocity detected by the posture detecting device 5 follow the entered vehicle pitch angle command and vehicle pitch velocity command. Namely, the posture controller 12 produces a posture velocity command for the drive unit 2, based on the vehicle pitch angle and vehicle pitch velocity detected by the posture detecting device 5, and the entered vehicle pitch angle command and vehicle pitch velocity command, and outputs the posture velocity command to the velocity command producer 15. Thus, the posture controller 12 performs control concerning the posture velocity command.

More specifically, the posture controller 12 calculates differences between the entered vehicle pitch angle command $\beta_r$, and vehicle pitch velocity command $\beta'_r$, and the vehicle pitch angle $\beta$ and vehicle pitch velocity $\beta'$ detected by the posture detecting device 5. Then, the posture controller 12 performs PD (proportional-derivative) control, or the like, so that the differences thus calculated become equal to zero.

Normally, the values of the vehicle pitch angle command $\beta_r$ and vehicle pitch velocity command $\beta'_r$, entered into the posture controller 12 are 0 (zero). In response to these commands, the posture controller 12 performs posture control so that the vehicle pitch angle $\beta$ and vehicle pitch velocity $\beta'$ generated due to shift of the weight (center of gravity) of the rider are kept equal to 0. The posture controller 12 calculates a posture velocity command (one example of first driving velocity command) according to Eq. (1) below, through the PD control. In Eq. (1), $K_{pp}$ denotes a proportional gain, and $K_{dp}$ denotes a derivative gain.

Posture Velocity Command=$K_{pp}(\beta^r-\beta)+K_{dp}(\beta'_r-\beta')$ (1)

By adjusting the above-indicated control gains $K_{pp}$, $K_{dp}$, it is possible to change the following capability of the motors in response to the vehicle pitch angle command $\beta_r$, and the vehicle pitch velocity command $\beta'_r$. For example, if the proportional gain $K_{pp}$ is adjusted to a small value, motor rotors operate with a delay in following, to slowly follow the commands. If the proportional gain $K_{pp}$ is adjusted to a large value, the motor rotors follow the commands at a high speed. Thus, by changing the control gain(s), it is possible to adjust the magnitudes of errors between the vehicle pitch angle command $\beta_r$ and vehicle pitch velocity command $\beta'_r$, and the actually detected vehicle pitch angle $\beta$ and vehicle pitch velocity $\beta'$, and the response time, thus assuring more appropriate or optimum control. The control performed by the posture controller 12 is not limited to the PD control, but may be H∞ control, fuzzy control, or the like.

The velocity command producer 15, which is one specific example of the velocity command producer 47, calculates a wheel angular velocity command (second driving velocity command) $\theta'_{com}$ according to Eq. (2) below, by adding the wheel angular velocity $\theta'$ detected by the wheel angular velocity detector 17, to the posture velocity command calculated by the posture controller 12.

Wheel Angular Velocity Command $\theta'_{com}$=Posture Velocity Command+Vehicle Angular Velocity $\theta'$ (2)

Thus, the actually detected wheel angular velocity is added to the posture velocity command calculated by the posture controller 12, so that the posture velocity command has an implication of an acceleration command, and the coaxial two-wheel vehicle 41 can be better stabilized.

In the case where wheel angular velocity commands are produced with respect to the right and left wheels 3A, 3B, as shown in FIG. 5, the respective velocity command producers 15A, 15B calculate right and left wheel angular velocity commands (right-wheel angular velocity command and left-wheel angular velocity command), according to Eq. (3) and Eq. (4) below, respectively, based on the posture velocity command calculated according to Eq. (1) above, and the wheel angular velocities of the right and left wheels detected by the respective wheel angular velocity detectors 17A, 17B.

Right-wheel Angular Velocity Command=Posture Velocity Command+Right-wheel Angular Velocity (3)

Left-wheel Angular Velocity Command=Posture Velocity Command+Left-wheel Angular Velocity (4)

Figure 6:
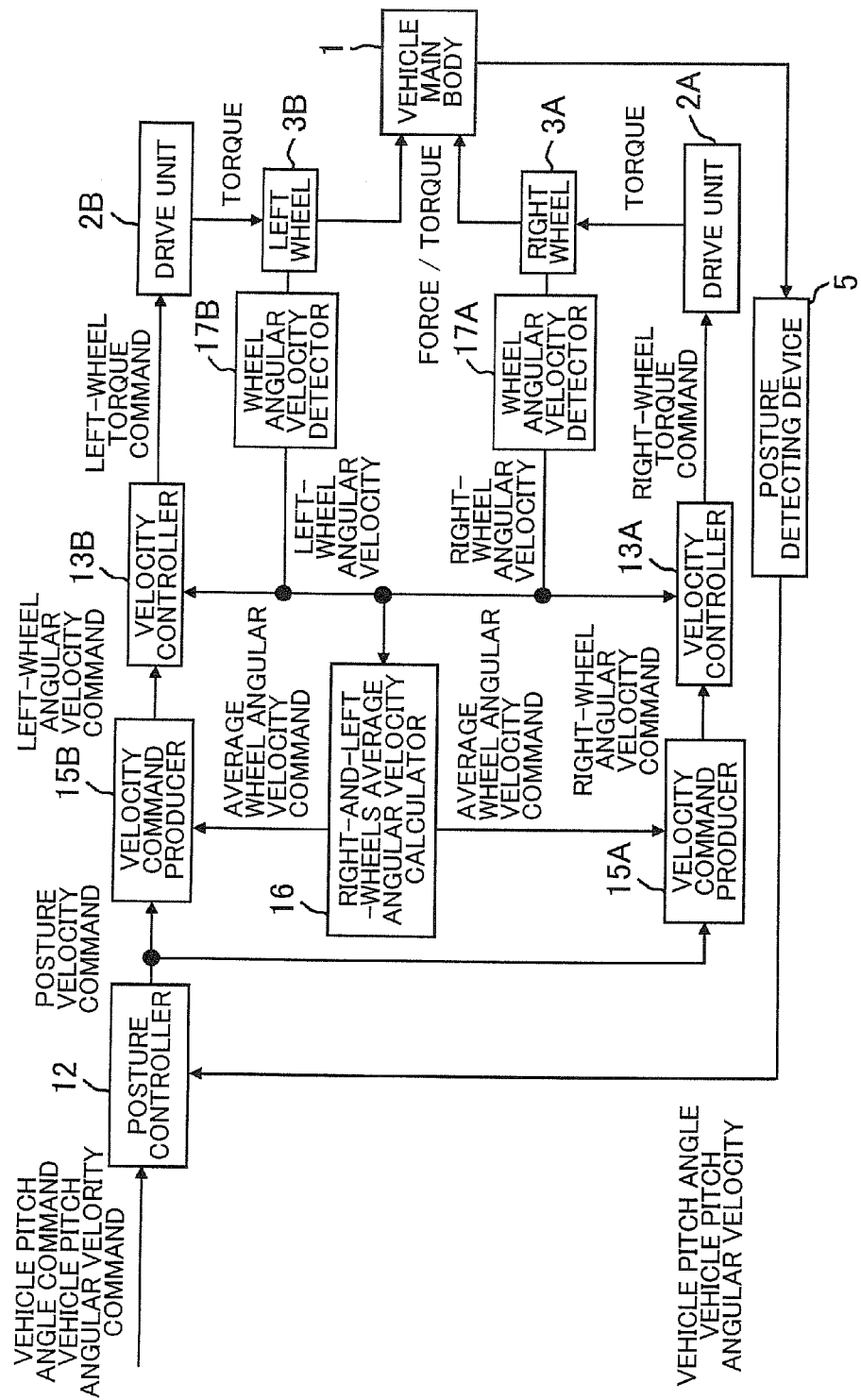
FIG. 6 is a view showing a configuration further including a right-and-left-wheels average angular velocity calculator.

As shown in FIG. 6, the moving body control system 10 may further include a right-and-left-wheels average angular velocity calculator 16. The right-and-left-wheels average angular velocity calculator 16, which is one specific example of an average velocity calculating device, calculates an average value (which will be called "average wheel angular velocity") of the wheel angular velocities of the right and left wheels 3A, 3B, according to Eq. (5) below, based on the right-wheel angular velocity of the right wheel 3A and the left-wheel angular velocity of the left wheel 3B detected by the wheel angular velocity detectors 17A, 17B, respectively.

Average Wheel Angular Velocity=(Left-wheel Angular Velocity+Right-wheel Angular Velocity)/2) (5)

The right-and-left-wheels average angular velocity calculator 16 outputs the calculated average wheel angular velocity to the right and left velocity command producers 15A, 15B. Thus, the wheel angular velocity commands for the right and left wheels 3A, 3B are produced using the average wheel angular velocity, so that the inertial force for raising the coaxial two-wheel vehicle 41 up in the pitching direction can be produced evenly with respect to the right and left wheels 3A, 3B, an the vehicle can be even better stabilized.

The velocity controller 13, which is one specific example of the velocity controller 46, calculates a difference between the wheel angular velocity command received from the velocity command producer 15, and the wheel angular velocity detected by the wheel angular velocity detector 17. Then, the velocity controller 13 performs PD (proportional-derivative) control so that the calculated difference becomes equal to 0, to thus perform velocity control so that the detected value coincides with the command value. Namely, the velocity controller 13 produces a torque command for each of two or more wheels 3, based on the received wheel angular velocity command, and the wheel angular velocity detected by the wheel angular velocity detector 17, and outputs the torque command to the corresponding drive unit 2. Since the velocity controller 13 performs simple PI control or PD control based on encoder information of the motor, a sufficiently fast control cycle can be achieved using inexpensive CPU.

Figure 7:
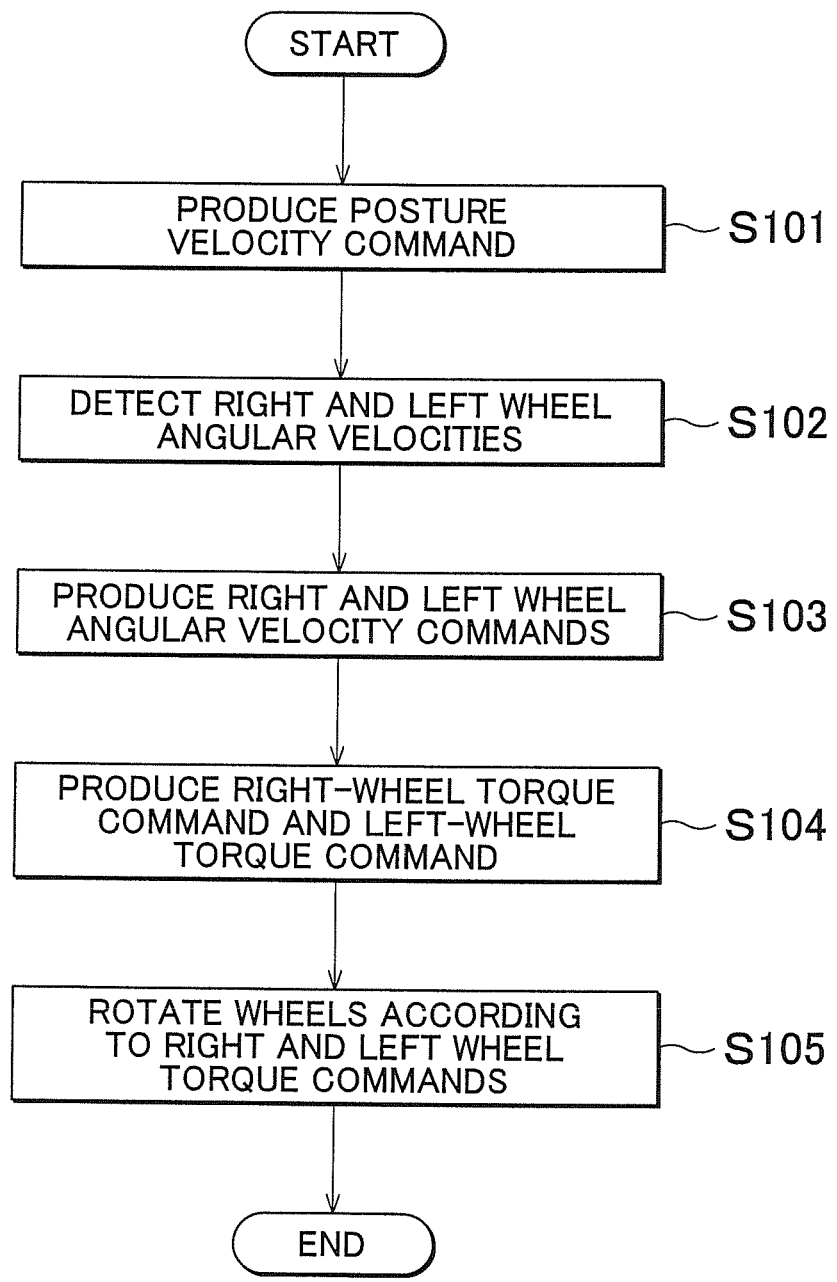
FIG. 7 is a block diagram showing a control process flow of a control method implemented by the moving body control system according to the first embodiment of the invention.

Next, a control method of the moving body control system according to the first embodiment will be described in detail. FIG. 7 is a block diagram illustrating a control process flow of the control method implemented by the moving body control system according to the first embodiment. The control process illustrated in FIG. 7 is repeatedly executed at given time intervals.

The posture controller 12 produces a posture velocity command for the drive units 2A, 2B, based on the vehicle pitch angle and vehicle pitch velocity detected by the posture detecting device 5, and the entered vehicle pitch angle command and vehicle pitch velocity command, and outputs the produced posture velocity command to the respective velocity command producers 15A, 15B (step S101).

The wheel angular velocity detectors 17A, 17B detect the right-wheel angular velocity and the left-wheel angular velocity, respectively, and output the detected velocities to the corresponding velocity controllers 13A, 13B and the corresponding velocity command producers 15A, 15B (step S102).

The velocity command producers 15A, 15B calculate the right-wheel angular velocity command and the left-wheel angular velocity command, respectively, by adding each of the right and left wheel angular velocities detected by the wheel angular velocity detectors 17A, 17B, to the posture velocity command calculated by the posture controller 12, and output the calculated commands to the corresponding velocity controllers 13A, 13B (step S103).

The velocity controllers 13A, 13B produce the right-wheel torque command and the left-wheel torque command, respectively, so that differences between the right-wheel and left-wheel angular velocity commands from the velocity command producers 15A, 15*b*, and the right-wheel and left-wheel angular velocities detected by the wheel angular velocity detectors 17A, 17B, become equal to 0 (step S104). The velocity controllers 13A, 13B output the produced right-wheel torque command and left-wheel torque command, to the corresponding drive units 2A, 2B, respectively. The drive units 2A, 2B rotate or drive the corresponding wheels 3A, 3B, in response to the right-wheel torque command and left-wheel torque command generated from the corresponding velocity controllers 13A, 13B (step S105), so as to produce the inertial force that raises the coaxial two-wheel vehicle 41 up in the pitching direction.

In the moving body control system 10 according to the first embodiment, the control loop 51 including the velocity controller 13 capable of high-speed control at a low cost and having a faster control cycle is provided inside the control loop 52 including the posture controller 12. This arrangement makes it possible to realize higher-performance control, while reducing the cost of the system as a whole. Furthermore, by adding the produced posture velocity command and the detected wheel angular velocity, the posture velocity command has an implication of an acceleration command. In this manner, the inertial force that raises the moving body 41 up in the pitching direction can be produced. Accordingly, even when the coaxial two-wheel vehicle 41 moves while being inclined at a certain angle, for example, it is possible to naturally raise the coaxial two-wheel vehicle up using the inertial force, so as to better stabilize the vehicle.

Figure 8:
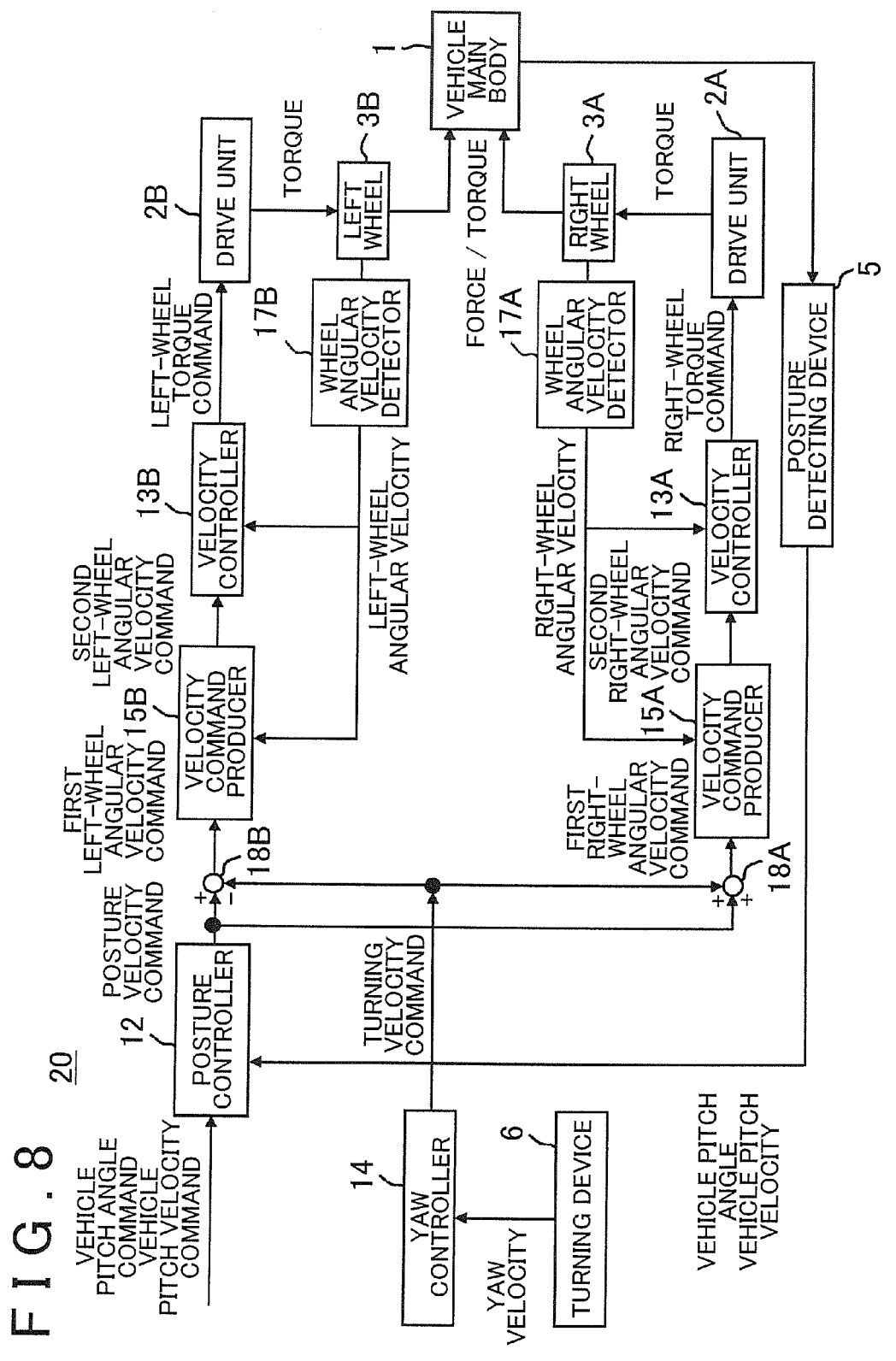

FIG. 8 is a control block diagram showing the system configuration of a moving body control system according to a second embodiment of the invention. The moving body control system 20 according to the second embodiment further includes a yaw controller 14, and adder-subtractors 18A, 18B, in addition to the configuration of the moving body control system 10 according to the first embodiment.

The yaw controller 14, which is one specific example of the turning control device, produces a turning velocity command, based on a yaw velocity command received from a turning device 6. The turning device 6 is provided in the vehicle main body 1, for example, and produces a vehicle turning angle command, turning velocity command, etc., as turning information commands, and outputs these commands to the yaw controller 14. The turning device 6 receives an amount of operation of the handle 4 by the rider, or an amount of operation of a turning handle (not shown) by the rider, for example, and produces the turning angle command and turning velocity command corresponding to the operation amount. As the turning device 6, a technology of entering a turning command according to the roll angle of the vehicle that is inclined due to shift of the center of gravity (or weight) of the rider (see Japanese Patent Application Publication No. 2006-315666 (JP 2006-315666 A)), which technology has been proposed by the applicant of this application, may be applied. In the following description, the turning velocity command will be explained as a yaw velocity command.

The yaw controller 14 resolves the yaw velocity command $\gamma'_r$ received from the turning device 6, into a turning velocity command to the respective wheels 3A, 3B, using the tread width 2L of the vehicle and the wheel radius R. The yaw controller 14 calculates the turning velocity command according to Eq. (6) below.

$$\text{Turning Velocity Command} = (L\gamma'_r)/R_w \qquad (6)$$

The adder-subtractors 18A, 18B, each of which is one specific example of the adding/subtracting device, adds the posture velocity command produced by the posture controller 12, and the turning velocity command produced by the yaw controller 14, or subtracts the turning velocity command from the posture velocity command. The adder-subtractors 18A, 18B output the calculated values, as first wheel angular velocity commands, to the respective velocity command producers 15A, 15B.

For example, the right-side adder-subtractor 18A produces a first right-wheel angular velocity command by adding the posture velocity command produced by the posture controller 12, and the turning velocity command produced by the yaw controller 14, and outputs the first right-wheel angular velocity command to the velocity command producer 15A. On the other hand, the left-side adder-subtractor 18B produces a first left-wheel angular velocity command by subtracting the turning velocity command produced by the yaw controller 14, from the posture velocity command produced by the posture controller 12, and outputs the first left-wheel angular velocity command to the velocity command producer 15B.

Each of the velocity command producers 15A, 15B adds the first wheel angular velocity command (the first right-wheel angular velocity command or the first left-wheel angular velocity command) from the corresponding adder-subtractor 18A, 18B, and a corresponding one of the wheel angular velocities of the right and left wheels 3A, 3B detected by the wheel angular velocity detectors 17A, 17B, to thus produce a second wheel angular velocity command (a second right-wheel angular velocity command or a second left-wheel angular velocity command), and outputs the second wheel angular velocity command to the corresponding velocity controller 13A, 13B.

The velocity controllers 13A, 13B produce a right-wheel torque command and a left-wheel torque command, respectively, so that a difference between the second right-wheel angular velocity command from the velocity command producer 15A and the right-wheel angular velocity detected by the wheel angular velocity detector 17A, and a difference between the second left-wheel angular velocity command from the velocity command producer 15B and the left-wheel angular velocity detected by the wheel angular velocity detector 17B, become equal to 0.

Figure 9:
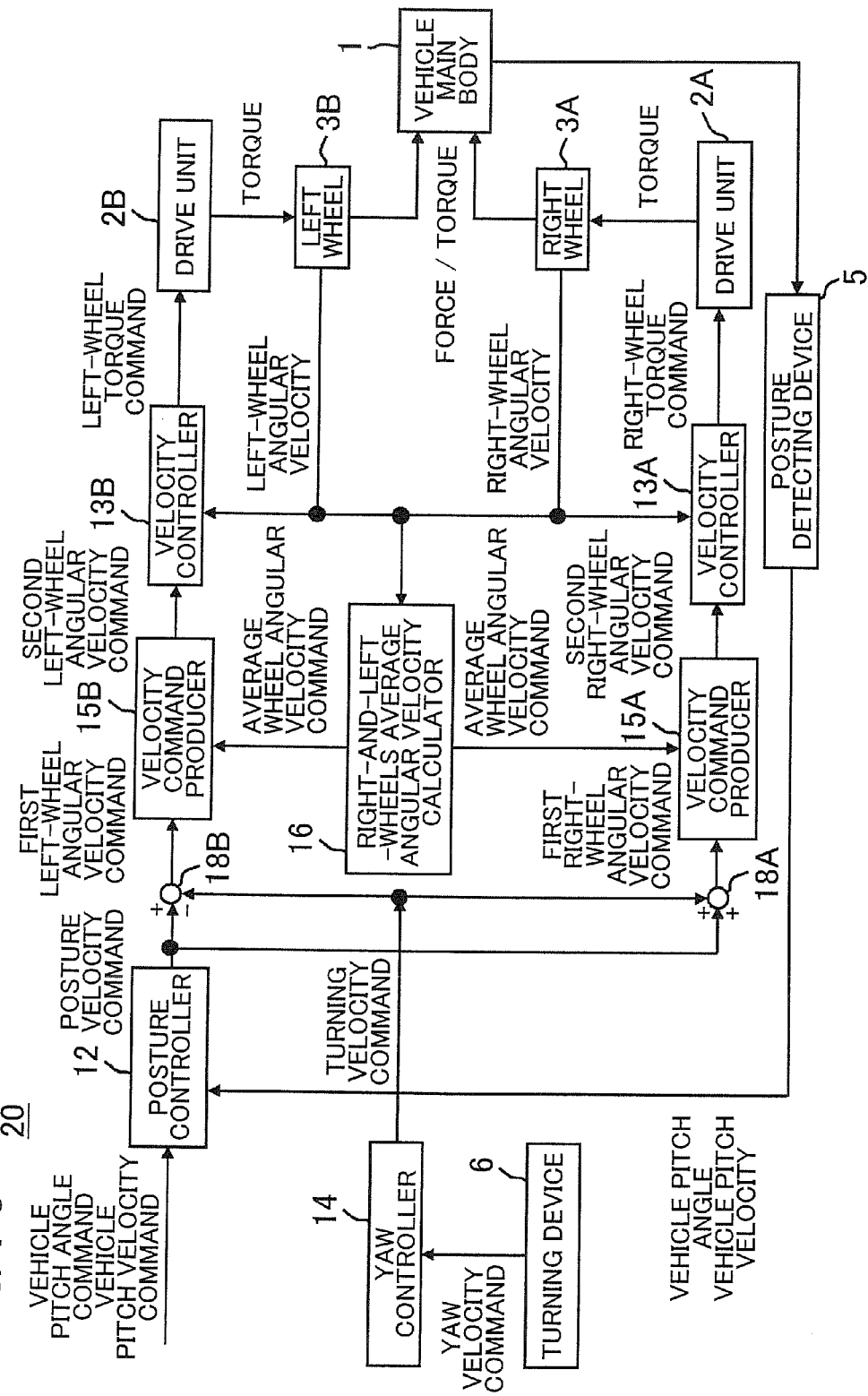
FIG. 9 is a view showing a configuration further including a right-and-left-wheels average angular velocity calculator.

As in the first embodiment, the control system according to the second embodiment may further include a right-and-left-wheels average angular velocity calculator 16 that calculates the average wheel angular velocity, based on the detected left-wheel angular velocity of the left wheel 3B and right-wheel angular velocity of the right wheel 3A, as shown in FIG. 9.

Each of the velocity command producers 15A, 15B adds a corresponding one of the first right-wheel angular velocity command and the first left-wheel angular velocity command from the respective adder-subtractors 18A, 18B, and the average wheel angular velocity from the right-and-left-wheels average angular velocity calculator 16, to thus calculate the second right-wheel angular velocity or the second left-wheel angular velocity, and outputs the calculated wheel angular velocity to the corresponding velocity controller 13A, 13B.

The remaining portions of the configuration of the second embodiment are substantially identical with those of the first embodiment, and detailed description of these portions will not be provided while the same reference numerals are assigned to the same components or portions. According to the second embodiment as described above, even when the coaxial two-wheel vehicle is turning, the inertial force that raises the vehicle up in the pitching direction can be generated. Thus, even in the case where the coaxial two-wheel vehicle 41 makes turning movement while being inclined at a certain angle, it is possible to naturally raise the coaxial two-wheel vehicle up using the inertial force, so as to better stabilize the vehicle.

It is to be understood that the invention is not limited to the above-described embodiments, but these embodiments may be changed or modified as needed, without departing from the principle of the invention.

While the invention has been described as hardware configurations in the illustrated embodiments, the invention is not limited to this type of configuration. Rather, the invention may be realized by causing a CPU to execute a computer program corresponding to the control process illustrated in FIG. 7, for example.

In this case, the computer program may be stored in any of various types of non-transitory computer readable media, and may be supplied to the computer. The non-transitory computer readable media include various types of tangible storage media. Example of the non-transitory computer readable media include a magnetic recording medium (such as a flexible disk, magnetic tape, or a hard disk drive), magneto-optical recording medium (such as a magneto-optical disk), CD-ROM (read-only memory), CD-R, CD-R/W, semiconductor memory (such as a mask ROM, PROM (programmable ROM), EPROM (erasable PROM), flash ROM, or RAM (random access memory)).

What is claimed is:

1. A moving body control system comprising:
   a driving device configured to drive a moving body;
   a driving velocity detector configured to detect a driving velocity of the driving device;
   a posture state detecting device configured to detect posture information of the moving body;
   a posture controller configured to produce a first driving velocity command for the driving device, based on the detected posture information, and an entered posture information command;
   a velocity command producer configured to produce a second driving velocity command for the driving device, by adding the first driving velocity command produced by the posture controller, and the detected driving velocity; and
   a velocity controller configured to control the driving device, by producing a torque command for the driving device, based on the produced second driving velocity command, and the driving velocity detected by the driving velocity detector,
   wherein the velocity controller performs velocity control so that the driving velocity detected by the driving velocity detector follows the second driving velocity command produced by the velocity command producer, and
   the posture controller is configured to perform posture control so that the posture information detected by the posture state detecting device follows the entered posture information command.

2. The moving body control system according to claim 1, wherein:
   the moving body includes at least one wheel;
   the posture controller is configured to produce a posture velocity command for the driving device, based on the detected posture information and the entered posture information command;
   the moving body control system further comprises a turning control device configured to produce a turning velocity command for the moving body based on an entered turning information command, and an adding/subtracting device configured to produce a first wheel angular velocity command for the moving body, by adding the posture velocity command produced by the posture controller, and the turning velocity command produced by the turning control device, or subtracting the turning velocity command from the posture velocity command;
   the velocity command producer is configured to produce a second wheel angular velocity command, by adding the calculated first wheel angular velocity command, and a wheel angular velocity detected by the driving velocity detector; and
   the velocity controller performs velocity control so that the wheel angular velocity detected by the driving velocity detector follows the produced second wheel angular velocity command.

3. The moving body control system according to claim 2, wherein:
   the moving body comprises right and left wheels;
   the moving body control system further includes an average velocity calculating device configured to calculate an average wheel angular velocity as an average value of the detected wheel angular velocities of the right and left wheels; and
   the velocity command producer is configured to produce the second wheel angular velocity command, by adding the first wheel angular velocity command calculated for each of the right and left wheels, and the calculated average wheel angular velocity.

4. A moving body control method comprising the steps of:
   detecting a driving velocity of a driving device that drives a moving body;
   detecting posture information of the moving body;
   producing a first driving velocity command for the driving device, based on the detected posture information, and an entered posture information command;
   producing a second driving velocity command for the driving device, by adding the produced first driving velocity command, and the detected driving velocity;
   controlling the driving device, by producing a torque command for the driving device, based on the produced second driving velocity command, and the detected driving velocity;
   performing velocity control so that the detected driving velocity follows the produced second driving velocity command; and performing posture control so that the detected posture information follows the entered posture information command.

5. A non-transitory computer readable medium storing therein a control program that causes a computer to perform the steps of:

producing a first driving velocity command for a driving device that drives a moving body, based on detected posture information of the moving body, and an entered posture information command;

producing a second driving velocity command for the driving device, by adding the produced first driving velocity command, and a detected driving velocity of the driving device that drives the moving body;

controlling the driving device, by producing a torque command for the driving device, based on the produced second driving velocity command, and the detected driving velocity;

performing velocity control so that the detected driving velocity follows the produced second driving velocity command; and performing posture control so that the detected posture information follows the entered posture information command.

* * * * *